United States Patent [19]

Hertrich

[11] Patent Number: 4,908,826
[45] Date of Patent: Mar. 13, 1990

[54] STORED DATA ERROR CORRECTION SYSTEM

[75] Inventor: Friedrich R. Hertrich, Boulder, Colo.

[73] Assignee: Digital Equipment Corporation, Maynard, Mass.

[21] Appl. No.: 141,061

[22] Filed: Jan. 5, 1988

[51] Int. Cl.$^4$ ............................................. G06F 11/10
[52] U.S. Cl. ........................................ 371/40.1; 360/53
[58] Field of Search ................. 371/38, 39, 40, 37, 371/2, 40.1, 40.2, 39.1, 38.1, 37.4, 37.1, 2.2; 360/38.1, 48, 53

[56] References Cited

U.S. PATENT DOCUMENTS

| | | | |
|---|---|---|---|
| 3,697,948 | 10/1972 | Bossen | 371/38 |
| 4,292,684 | 9/1981 | Kelly | 371/38 |
| 4,435,807 | 3/1984 | Scott | 371/50 |
| 4,564,945 | 1/1986 | Glover | 371/38 |
| 4,715,036 | 12/1987 | Oakes | 371/37 |
| 4,716,567 | 12/1987 | Ito | 371/39 X |

FOREIGN PATENT DOCUMENTS

| | | |
|---|---|---|
| 0191410 | 2/1986 | |
| 0198702 | 4/1986 | European Pat. Off. |
| 57-6419 | 1/1982 | Japan |
| 2011138 | 12/1978 | United Kingdom |
| 2016178 | 3/1979 | United Kingdom |

OTHER PUBLICATIONS

D. M. Oldham, "Error Detection and Correction", IBM Technical Disclosure Bulletin, vol. 13, No. 12, May 1971, 3715.
A. M. Patel "Coding Scheme for Multiple Sections Error Correction", IBM Technical Disclosure Bulletin, vol. 17, No. 2, Jul. 1974, 473-475.
Arvind M. Patel "Adaptive Cross-Parity (AXP) Code for a High-Density Magnetic Tape Subsystem" IBM Journal of Research and Development, Nov. 1985, vol. 29, No. 6, 546-562.
P. Prusinkiewicz and S. Budkowski, "A Double Track Error Correction Code for Magnetic Tape", IEEE Transactions on Computers, Jun. 1976, vol. C.-25/No. 6, 643-645.

*Primary Examiner*—Jerry Smith
*Assistant Examiner*—Robert W. Beausoliel
*Attorney, Agent, or Firm*—Fish & Richardson

[57] ABSTRACT

In a multi-track digital recording medium, data blocks on different tracks are algebraically combined to generate an error correction code (ECC) stored in an ECC block on one of the tracks. Unrecoverable errors due to horizontal and vertical clustering of dropouts on magnetic tape, for example, are reduced by XOR-ing data blocks along a diagonal path traversing several tracks to form the ECC.

17 Claims, 2 Drawing Sheets

STORED DATA ERROR CORRECTION SYSTEM

BACKGROUND OF THE INVENTION

The invention relates to error correction code strategies for parallel track recording.

Parallel track recording media, magnetic tape in particular, is vulnerable to a number of error producing physical defects capable of producing "hard errors" or "dropouts" which can effectively destroy prerecorded data at specific locations. Recording densities in terms of "bits per inch", for example, for high performance digital magnetic tape are increasing rapidly. As the memory cells on the tape become more closely packed, the magnetic energy available for "reading" the stored data becomes substantially lower. The higher the density, the lower the read signal level. As a result, the trend toward higher densities in itself makes the medium more susceptible to dropouts.

One way to cope with the growing dropout problem is to employ "write margining" designed to make the recording less vulnerable to errors which arise during the write mode. These techniques, of course, will not help if the tape gets damaged at a later time prior to rereading the information. Self erasure and tracking problems pose additional risks exacerbated by rising storage densities.

Storage systems designers embed special code words in the prerecorded data which can be used not only to check the validity of the data but also to reconstruct missing portions. Data is typically stored in a series of equal length blocks. Each block consists of a series of binary digits and has its own data checker (e.g., check sum or cyclical redundancy check (CRC code) associated with the block. In addition, the data in a series of blocks on a given track can be linked to an error correction code (ECC) stored in another block either on the same track or on another track. Because the ECC is an algebraic combination of the data in the series of blocks, a single, entirely missing data block can be reconstructed algebraically by using the ECC, assuming that the ECC is recovered intact. ECC strategies presently in use do not deal adequately with the higher error rates exhibited by high density tape systems presently under development.

SUMMARY OF THE INVENTION

The invention takes into account the distribution of dropouts in a realistic model of the error mechanism in multi-track recording systems, for example, tape drives. The invention prescribes an error correction code entity spanning several tracks at once. An error correction code is stored in an error correction code block on one track as an algebraic combination of data, including data found on a plurality of other tracks.

Specific embodiments of the invention include combining data in a first set of data blocks on one track with data in a second set of other blocks on other tracks to form the ECC for an ECC block on the one track. Preferably, no two of the other data blocks are on the same track. The other data blocks are preferably diagonally spaced on neighboring tracks within the ECC entity to help avoid the effects of horizontal and vertical clustering of dropouts. The preferred method of logically combining the blocks is to combine by the exclusive OR (XOR) operation all of the data in the first and second set of data blocks in the ECC entity bit by corresponding bit to form the ECC. Preferably, the other blocks include one block from each other track within the ECC entity.

In one embodiment of the invention, the ECC entity forms an n×n matrix having n tracks, each with at least n−1 data blocks and one ECC block. The ECC is preferably determined by the algorithm $$E_t = \sum_{b=1}^{n-1} (+)(A_{tb} (+) A_{|t+b|_{\mod n}}, b),$$

where $E_t$ is the ECC for track t and the tracks are numbered from 1 to n respectively, b is the block, the blocks being numbered from 1 to n−1, respectively, the ECC block being the nth block in the ECC entity, mod n designating arithmetic within the wraparound number set comprised of a repeating sequence of integers from 1 to n, the symbol (+) meaning the XOR operation and the symbol $\Sigma(+)$ meaning summation by XOR. Other aspects of the invention include the method of generating the above described ECC and a multi-track recording medium bearing prerecorded information within an ECC format of the above description.

The multi track ECC entity provided by the invention can be realized by a relatively straightforward algorithm easily implemented in micro-code or digital hardware and provides a greatly improved strategy for dealing with dropouts having a tendency to be clustered vertically as well as horizontally due to the nature of tape error mechanisms.

A specific implementation recovers single tracks totally lost or corrects vertical groups of blocks in a range of 50–87% of the tracks in error. Single ECC blocks may also be recovered from a parity scheme which may also serve as a hardware checker and auxiliary error detector.

Other advantages and features will become apparent from the following description of the preferred embodiments and from the claims.

DESCRIPTION OF THE PREFERRED EMBODIMENTS

The drawings are briefly described as follows.

8×8 Matrix

Hard errors show up in magnetic recording tape as a result of mechanical stress. For example, the tape may get snapped under high tension over the head islands. Intermittent power connections or lightning storms may cause all of the tracks on a multi track tape to suffer damage along vertical lines. In addition, defects have a tendency to cluster horizontally or cause multiple disturbances as a bump on the tape surface bounces over several islands of the head. The distribution of dropouts on multi track recordings is thus not entirely random, but exhibits a probablistic pattern of vertical and horizontal clustering. Vertical stress lines or creases apparently show up in the tape after extensive usage. The presence of vertical and horizontal clustering of dropouts, both permanent and nonrepeatable creates an opportunity to configure the ECC entity to avoid horizontal and vertical clusters, namely, by defining an ECC path through the diagonal space.

Figures 1, 3, 4:
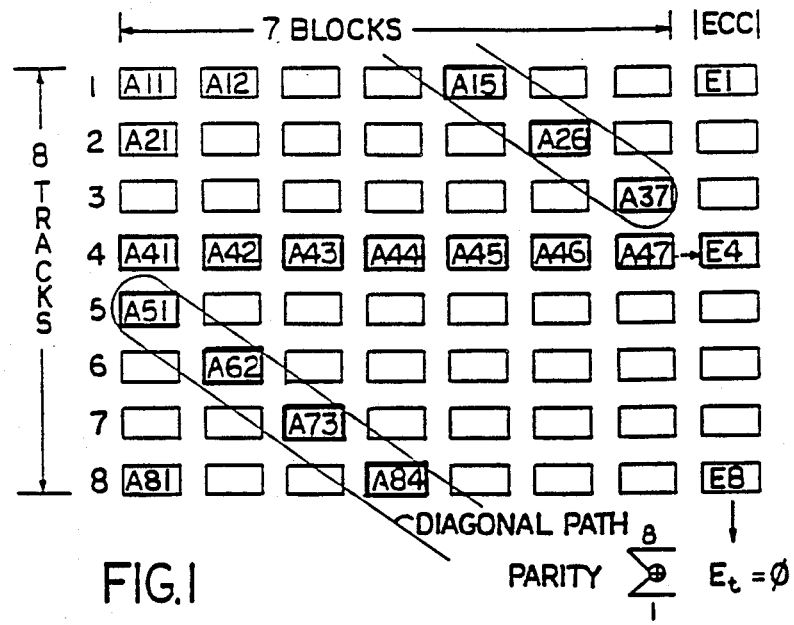
FIG. 1 is a schematic representation of an error correction scheme for an 8×8 block matrix according to the invention.
FIG. 3 is a schematic representation of an error correction scheme for a 4×10 matrix.
FIG. 4 is a schematic representation of an alternative error correction scheme for a 4×10 matrix according to the invention.

FIG. 1 represents an ECC strategy specifically designed for a 48 track magnetic tape drive with an 8 track head. The ECC entity comprises an 8×8 matrix of 64 blocks. There are 7 data blocks on each of 8 tracks followed by a single ECC block for each track. Each block of data may incorporate the conventional serial format of a header containing synchronization bits, a central data portion and a CRC. The data in an individual block is stored as a series of 1's and 0's. The CRC indicates an error within the block of data. The ECC is designed to detect and correct errors involving a whole block.

The nomenclature for describing the location of the blocks is in the format of Atb where A represents a data block as distinguished from an ECC block, t represents the track number from 1 through 8 and b represents the block number from 1 to 7. Each block $A_{tb}$ carries its own data and CRC. The ECC itself for a given track t is generated by XORing the data in each of the blocks on the given track along with the data in each block on a diagonal path traversing the other seven tracks, as shown in FIG. 1, in which the blocks XOR-ed into the ECC block for the fourth track ($E_4$) are indicated by a heavier outline.

The formula for generating the ECC for any track t is given by:

$$E_t = \sum_{b=1}^{7} (+)(A_{tb} (+) A_{jb})$$

where j equals $|t+b|_{mod\ 8}$, (+) signifies the XOR operation and $\Sigma(+)$ means the summation of terms by means of the exclusive OR operation instead of straight addition. The specific formula for the fourth ECC block is given by:

$$E_4 = \sum_{b=1}^{7} (+)(A_{4b} (+) A_{|4+b|_8\ b})$$

and in expanded form:

$$E_4 = (A_{41} (+) A_{51}) (+) (A_{42} (+) A_{62}) (+)$$
$$(A_{43} (+) A_{73}) (+) (A_{44} (+) A_{84}) (+)$$
$$(A_{45} (+) A_{15}) (+) (A_{46} (+) A_{26}) (+)$$
$$A_{47} (+) A_{37}$$

The term "mod 8" refers to wraparound arithmetic in the number set including only the numbers 1 through 8. Thus, where b=5, j=1 and $A_{jb}=A_{15}$. The order in which the blocks are XOR-ed, of course, makes no difference since the XOR operation is commutative. Altogether, 14 physical blocks have their data portions XOR-ed to form a single ECC for a given track. Because each block is entered twice in the XOR sum once as part of the track to which the ECC belongs and once as part of a diagonal path for another ECC, the XOR sum of all $E_t$'s in a given ECC entity should always be zero, equivalent to odd parity.

The system of FIG. 1 not only corrects a defective block, but also recaptures a missing ECC the opportunity to recover a single track totally lost. Moreover, it can correct vertical groups of blocks in a range of 50-87% of the tracks in error. A particularly desirable feature of this system is that it is backward compatible with single track recording schemes having ECC's which are an XOR combination of a series of blocks on the same track.

The scheme of FIG. 1 has the ability to handle the loss of multiple combinations of vertical blocks. With reference to FIG. 1, errors in odd vertical blocks 1, 3, 5 and 7, any 7 out of the 8 tracks plus any single ECC block may be lost an recovered (8 total). If there are errors in even vertical blocks 2 and 6, any 6 out of 8 tracks plus any single ECC block may be lost. However, the two remaining tracks must be one even and one odd track.

For errors in vertical block 4, there will be four incorrectable pairs out of 28. The best cases are losing the upper four or lower four tracks plus any single ECC block. The latter combinations are still correctable. Knowing that block column 4 may have a weakness, the write threshold may be margined more tightly. The penalty on rewrites will then be only 1 in 8 versus 8 in 8. This method effectively tightens the rewrite threshold where a known weak spot in the code exists.

Figure 2:
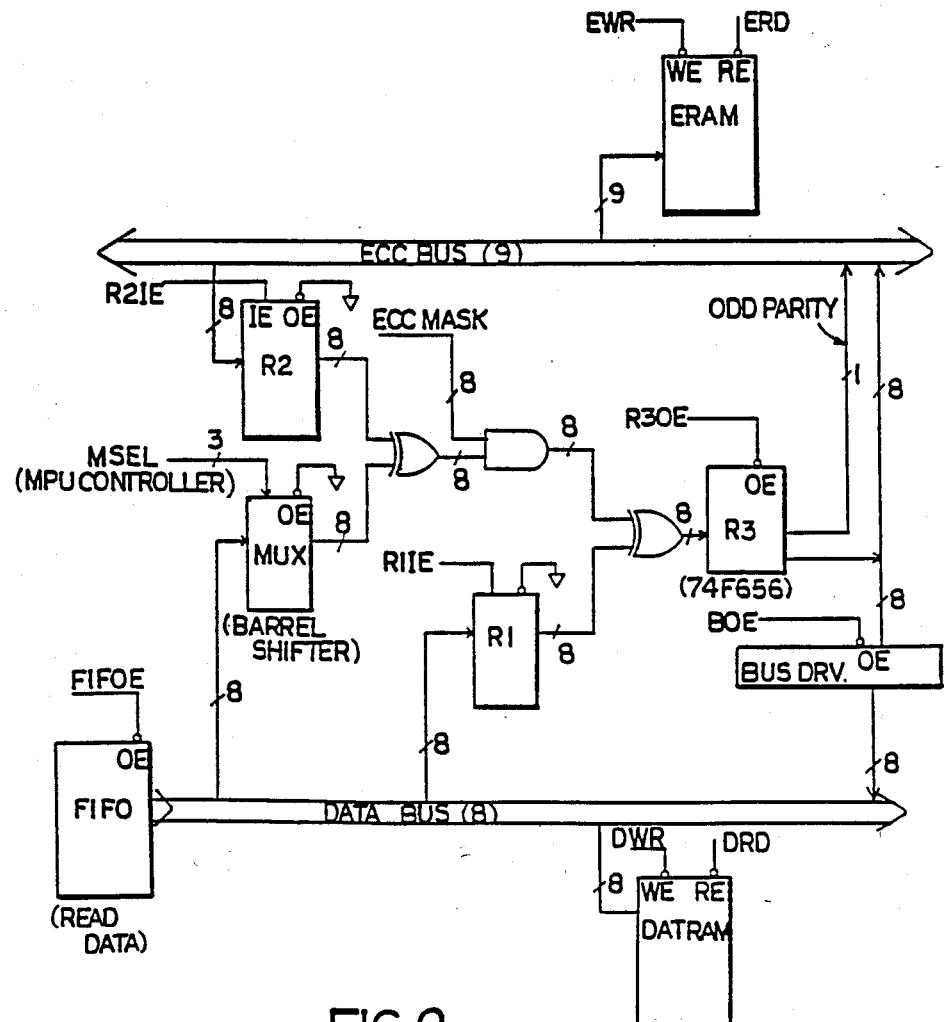
FIG. 2 is a discrete logic diagram of an error correction circuit for the scheme of FIG. 1.

FIG. 2 illustrates the hardware complexity required to perform the multi-track 8×8 matrix XOR scheme of FIG. 1. In FIG. 2, the ECC bus comprises nine lines, eight of which correspond to the 8 tracks and one of which corresponds to the odd parity signal generated by XORing vertically corresponding ECC's for 8 tracks. The data bus comprises 8 tracks which accept serial data either read from or written to the tape from the DATRAM. DWR and DRD refer to data write and data read signals. These enable signals and the others in FIG. 2 as well as control of the addressing functions is accomplished by timing circuitry, including counters and read only memories (ROM's) not shown. Read/write control of the ECC bus is accomplished similarly by ERAM under control of EWR (write enable) and ERD (read enable) lines.

Read data is placed on the data bus by means of first in first out data sequencer FIFO. The three registers R1, R2 and R3 are implemented by circuit type 74F656. The input/output lines from the registers and multiplexer (MUX) have eight parallel lines indicated by the symbol "/8". The multiplexer operates as a barrel shifter under microprocessor control in which a 3 bit code is incremented to output data on the next track and block to generate a diagonal path. The output of the multiplexer is XOR ed with the outputs from register R2 and then passed through an ECC mask, as shown, to another bank of XOR gates whose other inputs are from fixed tracks via register R1. The output of the second battery of XOR gates is fed to register R3 which, when enabled, operates as a bus driver. R3 generates parity of the eight ECC bus lines. Parity should always be "0" during write, a fact which makes it a good hardware diagnostic tool. A 12 MHz counter and ROM may have to be used for sequence control as it has not yet been found possible to produce the ECC on the fly with commercial microsequencers at a rate of 1 byte per microsecond. It probably will not be possible to process multiple errors in real time with the described technique. However, an attempt should be made to correct a single block during ECC time on the fly. It is estimated that the more complex multiple error process will have to be invoked once per 35 errors with the 8×8 matrix scheme.

The 8×8 matrix example generalizes to an n×n ECC entity matrix having n tracks each with at least n=1 data blocks and 1 ECC block. The ECC is determined by the generalized algorithm:

$$E_t = \sum_{b=1}^{n-1} (+)(A_{tb} (+) A_{|t+b|_{mod\ n}} b),$$

where the blocks are numbered from 1 to n−1 and the tracks are numbered from 1 to n.

4×10 Matrix

FIGS. 3 and 4 show two versions of a species of the same approach as in FIG. 1 in which the number of data blocks and tracks is equal and two ECC entities are interleaved on each track. FIG. 3 illustrates a 4 track by 10 block matrix. The nomenclature for identifying the blocks represents every other block on a given track by the letter A followed by numbers (or in the formulas by subscripts) indicating the track and block number as shown. The interleaved blocks are designated by the letter B. An ECC block corresponding to the A blocks in one track is designated as EA. The ECC block for the B blocks of a given track is designated EB.

The generalized formula for generating ECC blocks $EA_{t5}$ and $EB_{t5}$ for any given track t are as follows:

$$EA_{t5} = \sum_{b=1}^{4} (+) A_{tb} (+) \sum_{n=1}^{3} (+) B_{jk}, \text{ and}$$

$$EB_{t5} = \sum_{b=1}^{4} (+) B_{tb} (+) \sum_{n=1}^{3} (+) A_{jk},$$

where j=t−n and k=1+n, where n is an integer from 1 to 3.

As in the equations for FIG. 1, the XOR symbol represents a bit by bit XOR-ing of designated blocks of data. The addition or subtraction uses mod 4 wrap-around arithmetic in the number set comprising only the numbers 1, 2, 3 and 4. Thus, for example, where t=1 and n=3, j=1−3=−2=2 and k=1+3=4, thus $B_{24}$ is a part of $EA_{15}$.

For the particular case shown in FIG. 3 for the EA on track 1:

$$EA_{15} = \Sigma(+) A_{1b} (+) \Sigma(+) B_{1-n, 1+n} =$$

$$(A_{11} (+) A_{12} (+) A_{13}) (+) A_{14}) (+) (B_{42} (+) B_{33} (+) B_{24}$$

Another way of stating the logical rules for generating the ECC's for FIG. 3 is specified by the following logical rules or steps.

(1) All "A" blocks of a particular track XOR into "EA" block of same track.
(2) All "B" blocks of a particular track XOR into "EB" block of same track.
(3) All "A" blocks 2, 3, 4 of track "N" XOR into "EB" block of tracks N+1, N+2, N+3.
(4) "B" blocks 2, 3, 4 of track "N" XOR into "EA" block of tracks N+1, N+2, N+3. Note that steps 1 and 2 are consistent with a single track interleaved ECC scheme. Note that the diagonal path does not include blocks 1. This is simply because in this matrix only three blocks are needed for a complete diagonal path since there are only four tracks in all. Thus, there is one block left over which is arbitrarily designated as block 1.

The following table relates the blocks which are XOR-ed into the EA of the given track "N".

| Track 1: | | |
|---|---|---|
| | Track 4 + 1 | B42 |
| | Track 3 + 2 | B33 |
| | Track 2 + 3 | B24 |
| Track 2: | | |
| | Track 1 + 1 | B12 |
| | Track 4 + 2 | B43 |
| | Track 3 + 3 | B34 |
| Track 3: | | |
| | Track 2 + 1 | B22 |
| | Track 1 + 2 | B13 |
| | Track 4 + 3 | B44 |
| Track 4: | | |
| | Track 3 + 1 | B32 |
| | Track 2 + 2 | B23 |
| | Track 1 + 3 | B14 |

Thus, data blocks B42, B33 and B24 XOR into the EA for track 1. The EA's for tracks 2, 3 and 4 are similarly constructed. The EB's for tracks 1–4 are analogous.

FIG. 4 shows a variation on the scheme of FIG. 3 in which block 1 from the next lower track is XOR-ed in as well. The general equation for generating the ECC values is exactly the same as that for the scheme of FIG. 3 with the addition of the following single term to the entire expression:

$(+) A_{t-1}, 1$ for the EA block for track t and $(+) B_{t-1}, 1$ for the EB block for track t.

For the specific case illustrated in FIG. 4 for the EB of track 4:

$$EB_{45} = \sum_{b=1}^{4} (+) B_{4b} (+) \sum_{m=1}^{3} (+) A_{4-m,1th} (+) B_{4-1,1}$$

$$= (B_{41} (+) B_{42} (+) B_{43} (+) B_{44}) (+) A_{32} (+)$$

$$A_{23} (+) A_{14}$$

A comparison of the schemes of FIGS. 3 and 4 shows that FIG. 3 has 7 data blocks XOR-ed into each ECC block while FIG. 4 has 8 data blocks XOR-ed into each ECC block.

With reference again to FIG. 3, in a basic group of 5 blocks (4 data blocks plus 1 ECC block), there are ten pairs (5×4/2) that may have an error. The system of FIG. 3 removes all but one pair, namely, block 1 and block 5.

In the system of FIG. 4, block 1 of each group gets XOR ed to the next track of the same type (A to A and B to B). This method violates the objective of diagonal alignment. However, the risk of having both an A11 and A12 block enter into EB25, for example, will be far greater because of strong horizontal clustering.

One interesting property of the code of FIG. 4 is that the error density has to be sufficiently high before non-correctible combinations occur at a reasonable frequency.

The following approach may be used to achieve error correction in the systems of FIG. 3 and 4.

1. As a CRC error occurs in either an A or B block, an entry in an error array is made showing the error as a "native" error.

2. Simultaneously with step 1, a "foreign" error flag is stored using the same block number. The flag appears in the corresponding track number.

3. The error correction system looks at all error groups and corrects single entries first. As the correction is done, the native and foreign companion flags are removed in the two participating tracks. The process is repeated until there are no errors left or single and multiple pairs of errors remain. In the latter case, a hard error is posted and identified by recording the remaining error flags.

The system of FIG. 4 is especially attractive because a rather simple method of bad block reconstruction is employed. Each track and block type collects error pointers containing the physical block number and whether the error was "native" (same track) or "foreign" (different track). When error correction has to be invoked, only those tracks and types are corrected which have a single entry. The correction will then remove the appropriate native and foreign flags and proceed to the next single entry block in error.

One of the specific advantages of the systems of FIGS. 1, 3 and 4 is that single channel XOR systems, either noninterleaved as in FIG. 1 or interleaved as in FIGS. 3 and 4 represent primitive subsets of the foregoing correction algorithms. With only one track present, corrections will proceed on single block errors and stop if multiple flags have been collected. This feature neutralizes the issue of backward compatibility to single track systems employing these schemes.

Other embodiments are included within the claims. For example, the 8×8 matrix of FIG. 1 may be expanded to an 8×16 matrix by interleaving A and B blocks in a manner similar to FIGS. 3 and 4. This will tend to reduce the effect of horizontal clustering on adjacent blocks by spacing adjacent blocks belonging to a partucular ECC entity farther apart. Interleaving three or more sets of ABC, etc., blocks provides even greater horizontal spacing if desired.

What is claimed:

1. A method of generating an error correction code (ECC) for parallel track data recording on a recording medium in which several adjacent tracks are defined, each track including a series of blocks of recorded information arranged in a repeating alternating sequence of a group of data blocks and at least one associated ECC block, comprising
    defining an ECC entity having a predetermined width encompassing several adjacent tracks and a predetermined length encompassing several consecutive data blocks in each track, and
    algebraically combining data destined for a first set of data blocks on one track within said ECC entity with data destined for a second set of other blocks on other tracks within said ECC entity to form an ECC for an ECC block within said ECC entity on said one track,
    whereby the data in any single missing or defective one of said first or second set of blocks can be algebraically reconstructed.

2. The method of claim 1, wherein no two of said other data blocks are on the same track.

3. The method of claim 1, wherein said other data blocks are diagonally space on neighboring tracks within said ECC entity.

4. The method of claim 1, wherein the step of combining said data blocks includes XORing data in said first and second set of data blocks in said ECC entity to form said ECC.

5. The method of claim 1, wherein said other blocks include one block from each other track within said ECC entity.

6. The method of claim 1, wherein said ECC entity forms an n x n matrix having n tracks each with at least n−1 data blocks and 1 ECC block.

7. The method of claim 6, wherein said ECC is determined by the algorithm:

$$E_t = \sum_{b=1}^{n-1} (+)(A_{tb} (+) A_{|t+b|_{mod\ n}}, b),$$

where $E_t$ is the ECC for track t and the tracks are numbered from 1 to n, respectively, b is the block number, the blocks being numbered from 1 to n−1, respectively, the ECC block being the nth block in the ECC entity, mod n designating arithmetic within the wraparound number set comprised of a repeating sequence of integers from 1 to n.

8. The method of claim 1, wherein each track in said ECC entity has an ECC block, further comprising performing said algebraic combination so that a combination of all the ECC blocks in the ECC entity produces a known fixed result, whereby a single missing or defective ECC block can be reconstructed from the parity relationship between all of the ECC blocks.

9. A recording medium with prerecorded digital data in a format including an error correction facility, comprising
    a plurality of adjacent tracks defined in said recording medium, each track including a series of blocks of recorded information arranged in a series of data blocks and at least one associated ECC block, and
    an ECC entity defined in said medium having a predetermined width encompassing several adjacent tracks and a predetermined length encompassing several consecutive data blocks in each track, and
    an ECC recorded in an ECC block on one track being an algebraic combination of data in a first set of data blocks on said one track with data in a second set of other blocks on other tracks of said recording medium,
    whereby the data in any single missing or defective one of said first or second set of blocks can be algebraically reconstructed.

10. The medium of claim 9, wherein no two of said other data blocks are on the same track.

11. The medium of claim 9, wherein said other data blocks are diagonally spaced on neighboring tracks.

12. The medium of claim 9, wherein said ECC is formed by XOR-ing data in said first and second sets of data blocks.

13. The medium of claim 9, wherein said other blocks include one block from each other track within an ECC entity.

14. The medium of claim 9, wherein the tracks and blocks corresponding to said ECC form an n x n matrix having n tracks each with at least n−1 data blocks and one ECC block.

15. The medium of claim 14, wherein the ECC is determined by the algorithm:

$$E_t = \sum_{b=1}^{n-1} (+)(A_{tb} (+) A_{|t+b|_{mod\ n}}, b),$$

where $E_t$ is the ECC for track t and the tracks are numbered from 1 to n, respectively, b is the block number, the blocks being numbered from 1 to n−1, respectively, the ECC block being the nth block in the ECC entity, mod n designating arithmetic within the wraparound number set comprised of a repeating sequence of integers from 1 to n.

16. A method of generating an error correction code (ECC) for parallel track data recording on a recording medium in which several adjacent tracks are defined, each track including a series of blocks of recorded information arranged in a repeating alternating sequence of a group of data blocks and at least one associated ECC block, comprising defining an ECC entity having a predetermined width encompassing several adjacent tracks and a predetermined length encompassing several consecutive data blocks in each track, and algebraically combining data destined for a first set of data blocks on one track within said ECC entity with data destined for a second set of other blocks on other tracks within said ECC entity to form an ECC for an ECC block within said ECC entity on said one track, wherein said ECC entity forms an n x n matrix having n tracks each with at least n−1 data blocks and 1 ECC block, wherein said ECC is determined by the algorithm:

$$E_t = \sum_{b=1}^{n-1} (+)(A_{tb} (+) A_{|t+b|_{mod\ n}}, b),$$

where $E_t$ is the ECC for track t and the tracks are numbered from 1 to n, respectively, b is the block number, the blocks being numbered from 1 to n−1, respectively, the ECC block being the nth block in the ECC entity, mod n designating arithmetic within the wraparound number set comprised of a repeating sequence of integers from 1 to n.

whereby the data in any single missing or defective one of said first or second set of blocks can be algebraically reconstructed.

17. A recording medium with precorded digital data in a format including an error correction facility, comprising a plurality of adjacent tracks defined in said recording medium, each track including a series of blocks of recorded information arranged in a series of data blocks and at least one associated ECC block, and an ECC entity defined in said medium having a predetermined width encompassing several adjacent tracks and a predetermined length encompassing several consecutive data blocks in each track, and an ECC recorded in an ECC block on one track being an algebraic combination of data in a first set of data blocks on said one track with data in a second set of other blocks on other tracks of said recording medium, wherein the tracks and blocks corresponding to said ECC form an n ×n matrix having n tracks each with at least n−1 data blocks and one ECC block, wherein the ECC is determined by the algorithm:

$$E_t = \sum_{b=1}^{n-1} (+)(A_{tb} (+) A_{|t+b|_{mod\ n}}, b),$$

where $E_t$ is the ECC for track t and the tracks are numbered from 1 to n, respectively, b is the block number, the blocks being numbered from 1 to n−1, respectively, the ECC block being the nth block in the ECC entity, mod n designating arithmetic within the wraparound number set comprised of a repeating sequence of integers from 1 to n.

whereby the data in any single missing or defective one of said first or second set of blocks can be algebraically reconstructed.

* * * * *

UNITED STATES PATENT AND TRADEMARK OFFICE
CERTIFICATE OF CORRECTION

PATENT NO. : 4,908,826
DATED : March 13, 1990
INVENTOR(S) : Friedrich R. Hertrich It is certified that error appears in the above-identified patent and that said Letters Patent is hereby corrected as shown below:

Column 3, line 52, "$(_{46}$ (+) $A_{26})$" should be --$(A_{46}$ (+) $A_{26})$--.

Column 7, line 40, "partucular" should be --particular--.

Signed and Sealed this

Tenth Day of March, 1992

Attest:

HARRY F. MANBECK, JR.

Attesting Officer      Commissioner of Patents and Trademarks